UNITED STATES PATENT OFFICE 2,027,501

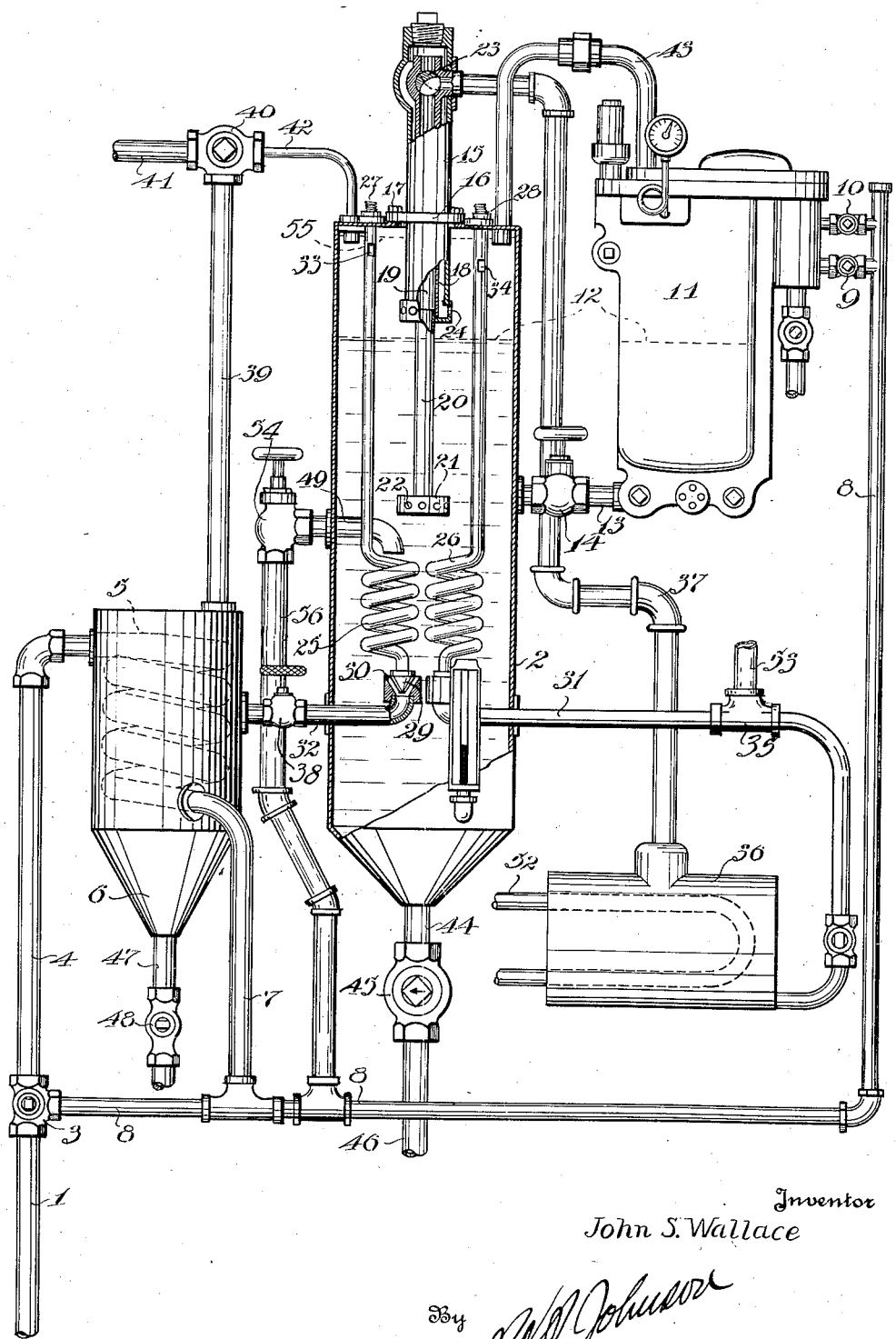

WATER PURIFYING MECHANISM

John S. Wallace, St. Paul, Minn.

Application September 23, 1931, Serial No. 564,510
Renewed November 26, 1934

4 Claims. (Cl. 210—15)

The present invention relates to a water purifying mechanism to be used in conjunction with steam generating apparatus.

One of the principal problems presented to the operator of steam generative apparatus is the prevention or removal of incrustations or scale formed on the interior of boilers and steam lines by deposits of cementitious, soluble solids contained in the water used for generating steam, and the formation of sludge formed by non-cementitious solids in the water.

An object of the present invention is to make an improved and simplified mechanism for purifying water.

In order to attain this object, there is provided, in accordance with one feature of the invention, a container having a combined steam and hot water spray head mounted therein to be immersed in water contained in said container to heat said water and to impart a swirling motion thereto, and a water inlet to feed water into the container, said container having an outlet opening adjacent the central axis thereof and above the bottom of the container to draw off purified water from said container.

These and other features of the invention will be more fully brought out in the following description and the accompanying drawing, wherein:

The illustration shows a container constructed in accordance with the present invention, with a portion of said container broken away to show the interior thereof and showing various mechanisms used in conjunction with said container to produce the required result.

Structure:

Referring to the drawing in detail, a water supply pipe 1 may be connected to a source of water supply such as a city water system, the water supply having a pressure greater than that to be maintained in a water purifying container 2 to be used in purifying the water. If the pressure on the available water supply is normally less than that required to be maintained in the water purifying container, the pressure may be increased to the proper degree by mechanism well known to the art and which it is deemed unnecessary to describe in the present specification. The water supply pipe 1 is connected to a two-way valve 3 from one side of which a pipe 4 is connected to a coil 5 enclosed in a water-tight container 6. The other end of this coil is connected by means of a pipe 7 to a pipe line 8 which is connected to the other side of the two-way valve 3. The pipe is connected by means of valves 9 and 10 to a constant level float valve 11. This float valve may be of an ordinary type well known to the art and which it will be unnecessary to describe in detail here. This float valve maintains the level of the water in the container with which it is associated at the level indicated by the dotted lines 12. From the lower end of the float valve 11 a pipe 13 is connected through a valve 14 to the interior of the container 2. Mounted in the top of the container 2 to extend downwardly therein, is a steam casing 15 having an annular flange 16 thereon which seats around the edge of a circular opening in the top of the container 2 and is held in position thereon, as by means of bolts 17 to form a steam-tight joint therewith. The casing 15 has an annular steam jacket 18 formed therein and a central tubular opening 19. In the lower end of this central tubular opening 19 is threadedly inserted a pipe 20 having a spray head 21 on the lower end thereof. This spray head 21 has openings 22 in the sides thereof, these openings being angularly offset with respect to the radii of the spray head so as to discharge the steam and water ejected through this spray head as nearly tangentially as possible to the spray head so as to cause a swirling of the water in the container by the action of steam and water ejected through this spray head.

A two-way valve 23 is provided at the upper end of the inner tubular portion of the casing 15, this valve being adapted to direct the steam and water introduced therein downwardly through the central opening 19 of the casing through the pipe 20 and through the spray head 21 when the valve 23 is in the solid line position indicated in the drawing. When said valve is moved to the dotted line position indicated in the drawing, the steam and water will be directed upwardly through the upper end of the central opening 19 of this casing, thence downwardly around the jacketed outer portion 18 of the casing and thence through openings 24 in the lower end of the casing, which thus constitutes a secondary or alternate spray head. These openings 24 are also positioned angularly with respect to the radii of the casing so as to cause a similar swirling action when the steam and water are discharged through these openings 24 in the casing. A pair of similar coils 25 and 26 are secured to the upper end of the container to extend downwardly therein, these coils being closed at their upper ends and threaded exteriorly thereof, so as to be held in position by means of nuts 27 and 28. The lower end of each of the coils is provided with a tapered, enlarged head portion 29 which seats into a tapered seat 30 in pipes 31 and 32. When these coils 25 and 26 are in the raised position as indicated in the illustration, water from the container 2 is free to flow downwardly through the spaces between the tapered head portions of these coils and the tapered seats 30 therefor. When the coils 25 and 26 are lowered by means of the nuts 27 and 28, the tapered head portions 29 seat in the tapered seats 30 provided therefor to form a substantially watertight joint. Openings 33 and 34 are provided in the coils 25 and 26 adjacent the upper ends thereof, respectively, the opening 33 in the side of the coil 25 being somewhat higher than that in the coil 26. The pipe 31 associated with the coil 26 is connected through a T-fitting 35 to a steam generative boiler 36. In the upper end of this steam generating boiler a pipe 37 is connected to the two-way valve 23 in the jacketed casing 15. The other pipe 32 associated with the coil 25 is connected through a valve 38 to the interior of the container 6 which houses the coil 5. In the upper end of the container 6 a pipe 39 is connected to a two-way valve 40 which is connected on one side to a discharge pipe 41 and on the other side to a small pipe 42 mounted in the upper end of the container 2 to project downwardly therein a short distance. A pipe 43 is connected from the interior of the container 2 to the interior of the float valve 11 to equalize the pressures between the chamber of the float valve 11 and the container 2. From the lower end of the container 2 a sludge pipe 44 is connected through a valve 45 to a discharge pipe 46 to permit draining the sludge and sediment which collects at the bottom of the container 2. A similar sludge pipe 47 and discharge valve 48 is connected to the bottom of the container 6.

An auxiliary inlet pipe 49 is mounted to admit water into the container 2 when the device is used without the float valve 11 and this pipe 49 is arranged to discharge water downwardly over the coil 25 to heat the incoming water and simultaneously cool the water in the coil 25. A valve 54 is connected to control the flow of water through this auxiliary inlet pipe.

Operation:

There are two ways in which the device as illustrated in the present drawing may be operated.

First, using the water level device 11 to maintain the water in the container 2 at a constant level below the top of the container 2; and, second, without the float valve 11 where the supply of water is fed directly into the container 2 from the city water supply, or other suitable source.

Describing first the operation of the mechanism when used with the float valve 11, the coils 25 and 26 are raised by means of the nuts 27 and 28 to raise the tapered portions 29 of the coils 25 and 26 from their seats 30 so as to permit water to flow from the interior of the container 2 between the tapered portions 29 and the seats 30 into the pipes 31 and 32. The incoming water may be passed from the supply pipe 1 through the pipe 4, the coil 5, the pipe 7, and the pipe 8 into the float compartment 11 from whence it will be discharged into the interior of the container 2 to maintain the level of the water in the container at the level for which the float valve 11 is adjusted. An alternate method of introducing the incoming water into the container 2 is through the supply pipe 1, the pipe 9, and thence through the float valve to the container 2. Either course may be used by adjusting the two-way valve 3. The water level in the present instance is indicated by the transverse dotted lines 12 across the float chamber 11 and the container 2. The U-shaped pipe 43 interconnects the float chamber with the upper end of the container 2 to balance the pressures in the container 2 and the float chamber 11. The incoming water will be considerably cooler than that in the container 2 even when it is passed through the heat transfer coil 5, so it is desirable, where a comparatively large quantity of water is to be treated, to have the incoming water discharged into the container above the spray head 21 as this colder water will tend to move downwardly in the water in the container, as it is of a higher specific gravity than the hot water in the container. It is desirable to have this colder water pass downwardly over the spray head to be acted on by the swirling spray of steam and hot water injected through this spray head.

The generation of steam necessary to accomplish this purpose is performed in the boiler 36 which may be heated in any suitable manner, a high pressure steam line 52 being illustrated as one method of accomplishing this object.

The path of circulation through the steam generative apparatus is as follows: Water from the container 2 passes between the enlarged tapered end portion 29 of the coil 26 and the seat 30 into the pipe 31 from whence it passes into the steam generating chamber 36. Steam and hot water move upwardly in the pipe 37 and thence with the valve 23 in the solid line position, as indicated in the drawing, this mixture of steam and hot water passes downwardly through the tubular central opening 19 in the casing 15 downwardly through the pipe 20 and outwardly through the openings 22 in the spray head 21.

As previously described, these openings are set as nearly tangentially to the arc of the periphery of this spray head as possible and as the mixture of steam and hot water is ejected through the openings in the spray head, it heats the water in the container and also imparts a swirling motion to it. The heat causes the cementitious soluble particles to precipitate out and the swirling action imparted to the water by centrifugal force causes these particles, and also any insoluble particles, to move outwardly toward the walls of the circular container 2. As these particles are of greater specific gravity than the water they are carried downwardly by the circulation caused by the spray head and also their greater specific gravity and gradually precipitate downwardly to the bottom of the container 2 and collect in the lower end thereof from whence they may be discharged through the sludge pipe 44 by opening the valve 45 at intervals, determined by the amount of water being used.

The water withdrawn from the tank into the steam circulating system above described is taken from as near the center of the tank as practicable, so as to withdraw a minimum number of these particles, the centrifugal force of the swirling water keeping the majority of the particles toward the outside of the container.

Where it is desired to use the water from the container at as near its maximum temperature as possible, a line 53 is connected to the T-fitting 35, so that, if desired, the water may be drawn directly from the interior of the container 2 to the place where it is to be used. Where it is desired to cool the water somewhat before using and at the same time heat the incoming water, the water is withdrawn from the tank through the pipe 32 into the interior of the container 6 and thence upwardly through the pipe 39 through the two-way valve 40 and thence through the pipe 41 to the point where it is to be used.

The coil 5 having the incoming cold water therein tends to cool the water in the container 6 and also, since the heat of the water in the container is transferred to the cold water in the coil 5, this serves to heat the incoming water and thus reduces the amount of heat necessary to generate steam.

Where the device is to be used without the float valve 11, the valves 9 and 10 are closed, and the water is introduced from the supply pipe 49 into the container 2 until air trapped in the upper end of the container above the openings 33 and 34 and the lower end of the pipe 42 is compressed to a pressure equal to that of the water in the container. The trapping of a small quantity of air in the upper end of the container 2 is accomplished by having the opening 33 in the coil 25 and the lower end of the pipe 42 spaced downwardly from the upper end of the container. This trapping of a small quantity of air in the upper end of the container is desirable to prevent pounding, which otherwise would be caused by the discharging of the mixture of steam and hot water into the interior of the container.

The coils 25 and 26 are lowered by means of the nuts 27 and 28 so that the enlarged tapered end portions of the coils rest in the seats 30 to form a substantially water-tight joint. It is not necessary that these joints be absolutely water tight, since a small quantity of water entering through these joints would not affect the operation of the device. When the device is to be thus used without the float mechanism 11, the two-way valve 23 in the casing 15 is turned to the dotted line position indicated. For the purpose of the present description, the water level in the container 2, with the float valve in inoperative position, is controlled by the outlet 33 and end of pipe 42 and may be assumed to be at the level indicated by the dotted line 55.

The circulation through the steam generator with this arrangement is through the opening 34 into the coil 26, thence downwardly into the pipe 31, from whence it passes through the steam generating mechanism 36 upwardly through the pipe 37, through the valve 23, and out the upper end of the inner tubular opening in the casing 15, whence it passes down through the jacket 18 and out through the tangentially disposed openings 24 in the lower end of the casing.

The water to be withdrawn from the container for use will pass through the opening 33 into the interior of the coil 25, thence downwardly through the coil 25 and outwardly through the pipe 32 into the container 6. From the container 6 the water passes upwardly through the pipe 39 to its point of use. The incoming water is introduced into the container 2 from the supply pipe 1, from whence it may be passed either through the pipe 4, coil 5, pipe 7, pipe 56, valve 57, and pipe 49 downwardly over coil 25, or by setting the two-way valve 3 to direct the incoming water into the pipe 8, the water will pass from pipe 8 to pipe 56 and thence as above described into the container 2. If it is desired to use the water directly from the tank without thus transmitting a portion of its heat to the incoming cold water, the two-way valve 40 may be turned to close the opening to the pipe 39 and open an opening to the small pipe 42. This will permit water to be withdrawn directly from the small pipe 42 and the pipe 41 to the point of use. The steam rising from the spray head causes an upward movement in the central portion of the container 2 and this in turn causes a downward movement of the water adjacent the walls of the container. The swirling movement of the water, as above described, carries the particles of impurities therein by centrifugal force toward the walls of the container, where the weight of the particles, combined with the downward movement of the water, carries these particles down toward the bottom of the container. These up and down currents are not clearly defined in the lower portion of the container, since there is no means at the lower portion of the container to guide or stimulate them and consequently eddy currents are formed in the lower part of the container which permit the particles to settle, by means of their higher specific gravity, into the sludge chamber which comprises the lower end of the container.

The opening 34 being adjacent the upper end of the coil 26 and spaced inwardly from the wall of the container, withdraws the water for circulation through the steam generating apparatus from the point in the container where the water is comparatively clear of impurity particles.

The device is simple and practical in operation and has no mechanically operated moving parts to get out of order. It has been found that where the present purifier is used with steam boilers and similar apparatus, the scaling of the boilers is greatly reduced and that water withdrawn from the container is much lower in soluble cementitious matter than the same water before being subjected to the treatment herein described.

If it is desired to use a large quantity of water, several of these water purifiers may be connected in series or a battery of them may be used separately discharging into a common line. Such adaptations could readily be accomplished by a mechanic versed in the art, and it is believed unnecessary to show these various combinations in the present specification.

I claim:

1. A water purifying mechanism, comprising a cylindrical casing, a spray head mounted therein, said spray head having openings substantially tangential to the periphery thereof, liquid supply means opening interiorly of said casing, liquid control means mounted to maintain a substantially constant liquid level in said casing above said spray head, liquid outlet means having an opening therein below the normal liquid level in said container through which opening water is withdrawn from the interior of said casing, said opening being spaced inwardly from the walls of said casing, said casing being open and unbaffled between said outlet opening and said spray head, and steam supply means connected to said spray head to discharge steam through the openings therein to heat water in said casing and to impart a swirling motion thereto.

2. A water purifying mechanism, comprising a cylindrical casing, means mounted to maintain a predetermined liquid level therein, a spray head mounted therein, said spray head having substantially tangentially disposed openings therein, below the liquid level of said casing, liquid supply means opening interiorly of said casing normally above said spray head and adjustable to open said supply below said spray head, liquid outlet means opening into said casing normally above said spray head and adjustable to open said outlet below said spray head, and steam supply means connected to said spray head to introduce steam through the openings therein to heat said water and to impart a swirling motion thereto.

3. A water purifier comprising a casing, water supply means mounted to discharge into said casing, control means mounted to control the water level in said casing, a coil mounted in said casing and having an opening adjacent the upper end thereof, said coil extending downwardly into said casing and outwardly through a wall thereof, a spray head mounted in said casing below the normal water level thereof and having tangentially disposed outlets therein, a circulatory piping system connected from the lower end of said coil to said spray head, heating means associated with said piping system to heat water therein to cause a circulation from the opening in the upper end of said coil downwardly through said coil, through said circulatory piping system, outwardly through said circulatory piping system, outwardly through said spray head to heat the water in said tank adjacent said spray head and to impart a swirling motion thereto, and an outlet pipe having an opening interiorly of said tank spaced vertically from said spray head, the space between said outlet and said spray head in said casing being open and unbaffled.

4. A water purifier comprising a casing, a water inlet mounted to discharge water interiorly of said casing, control means associated with said casing to maintain a predetermined water level therein, a water outlet having an opening interiorly of said casing and spaced inwardly from the wall thereof, said outlet being connected to a pipe circuit extending exteriorly of said casing, a spray head mounted interiorly of said casing and below the normal water level in said casing, said spray head, having tangentially disposed outlets to impart a swirling motion to water in said casing, being connected to said pipe circuit connected to said outlet, heating means associated with said pipe circuit to heat water therein and impart a circulative movement thereto from said outlet through said pipe circuit and back through said spray head to precipitate impurities dissolved in water, and secondary outlet means opening into said casing at a point near the upper end thereof to withdraw heated and purified water from said casing.

JOHN S. WALLACE.